No. 615,874. Patented Dec. 13, 1898.
H. A. MOYER.
VEHICLE RUNNING GEAR.
(Application filed Jan. 17, 1898.)
(No Model.) 2 Sheets—Sheet 1.

WITNESSES:
H. B. Smith
J. J. Laass

INVENTOR
Harvey A. Moyer
By E. Laass
ATTORNEY

No. 615,874. Patented Dec. 13, 1898.
H. A. MOYER.
VEHICLE RUNNING GEAR.
(Application filed Jan. 17, 1898.)

(No Model.) 2 Sheets—Sheet 2.

WITNESSES:
H. B. Smith
J. J. Laass

INVENTOR
Harvey A. Moyer
By E. Laass
ATTORNEY

UNITED STATES PATENT OFFICE.

HARVEY A. MOYER, OF SYRACUSE, NEW YORK.

VEHICLE RUNNING-GEAR.

SPECIFICATION forming part of Letters Patent No. 615,874, dated December 13, 1898.

Application filed January 17, 1898. Serial No. 666,893. (No model.)

*To all whom it may concern:*

Be it known that I, HARVEY A. MOYER, of Syracuse, in the county of Onondaga, in the State of New York, have invented new and useful Improvements in Running-Gear for Vehicles, of which the following, taken in connection with the accompanying drawings, is a full, clear, and exact description.

The object of the invention is to provide an absolutely strong and safe king-bolt connection of the head-block to the front axle of the vehicle; and to that end the invention consists in the improved construction and combination of parts hereinafter described.

Figure 1:
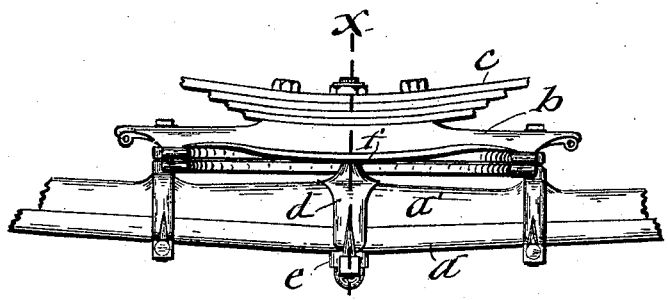
Figure 2:
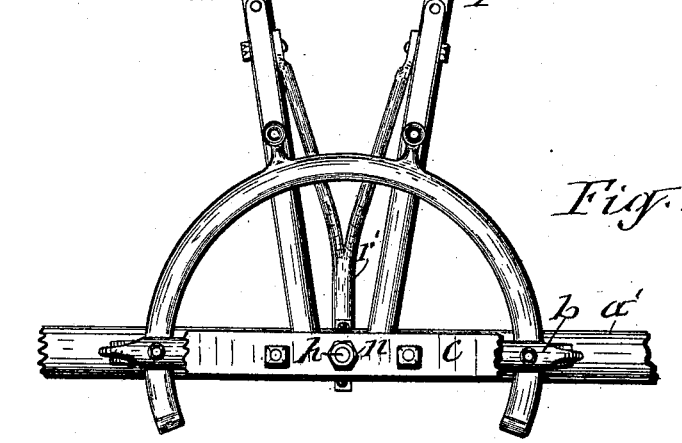
Figure 3:
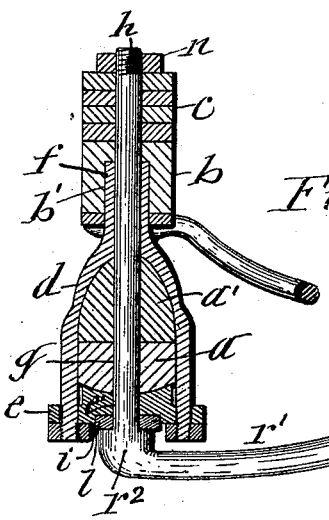
Figure 4:
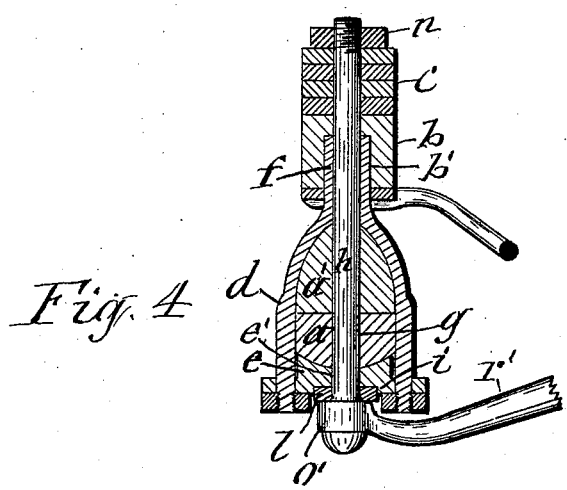

In the annexed drawings, Figure 1 is a front view of that part of the front axle and surmounted parts to which my invention is applied. Fig. 2 is a plan view of the same. Fig. 3 is an enlarged transverse section on line $x$ $x$ in Fig. 1, and Figs. 4, 5, and 6 illustrate modifications.

Similar letters of reference indicate corresponding parts.

$a$ represents the front axle of a vehicle; $b$, the head-block; $c$, the cross-spring mounted on said head-block, and $r$ the reaches by which the hind running-gear is connected to the front running-gear. Said axle may be of any ordinary and well-known construction. In the present instance it is provided with the usual so-called wooden "bed-piece" $a'$.

$d$ represents a clip which embraces the axle at its center and is fastened thereto by the clip-tie $e$ in the usual manner. This clip is formed with a tubular post $f$, which is directly over the king-bolt hole $g$ in the axle, the axle-channel of said post being in line with said bolt-hole. The clip-tie $e$ is provided with an eye $e'$, which is also in range with the king-bolt hole in the axle.

The head-block $b$ is formed with a socket $b'$, extending from the bottom into the main portion of the body of the head-block, and into this socket extends the clip-post $f$, which constitutes the pivot of the axle and completely relieves the king-bolt from shearing strain.

$h$ denotes the king-bolt proper, which may be either formed integral with the lower reach-brace $r'$, as more clearly shown in Fig. 3 of the drawings, or formed separately from said brace and interlocked therewith to prevent the king-bolt from turning on said brace. Said king-bolt passes through the eye of the clip-tie and through the axle $a$, clip-post $f$, head-block $b$, and spring $c$, and is screw-threaded on its upper protruding end and provided with a nut $n$, which serves to tie said parts together.

It will be observed that inasmuch as both the king-bolt and head-block are fastened to the reaches all of said parts are maintained in a uniform position in relation to each other, and consequently the nut on the upper end of the king-bolt is not subjected to any bearing which tends to turn it.

To further guard against rattling of the coupling, I fasten the reach-brace $r'$ to the reach in such a manner as to cause said brace to extend rigidly from the reach and to be thereby sustained automatically in its bearing on the under side of the axle, and I form the under side of the clip-tie $e$ with a socket $i$ and place therein a packing-ring $l$, upon which rests a head $r^2$, formed on the reach-brace $r'$ directly under the king-bolt.

By properly tightening the nut $n$ on the king-bolt the head $r^2$ is held firmly upon the packing-ring $l$, which is of a sufficient diameter to hold the said head out of contact with the axle, and thus the rattling thereat is effectually prevented.

Figure 5:
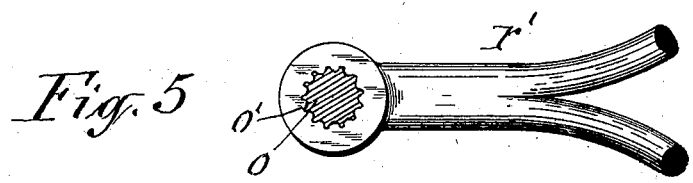
Figure 6:
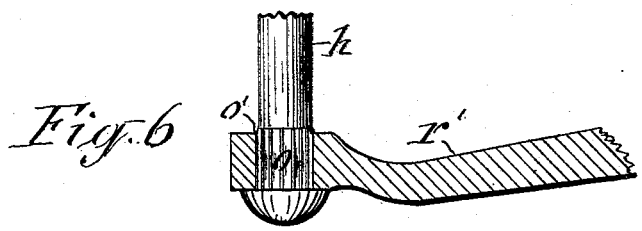

I do not limit myself to the use of the described clip king-bolt $d$ with a king-bolt proper formed integral with the reach-brace, inasmuch as said king-bolt may be formed separately from said brace and prevented from turning with the axle by a vertically-corrugated lower end portion $o$ of the bolt, fitted snugly in and interlocked with a correspondingly-corrugated eye $o'$ in the reach-brace $r'$, as shown in Figs. 5 and 6 of the drawings. This last-described construction is in many cases preferred.

What I claim is—

In combination with the front axle, head-block and reach, the reach-brace extending rigidly from the reach and to the bottom of the axle, the king-bolt passing through the axle and head-block and fastened to the reach-brace to prevent the king-bolt from turning thereon and the axle-clip formed with a tubular post extending part way into the head-block and receiving through it the upper end portion of the king-bolt, substantially as set forth and shown.

HARVEY A. MOYER.

Witnesses:
J. J. LAASS,
H. B. SMITH.